United States Patent [19]
Honey et al.

[11] 3,965,341
[45] June 22, 1976

[54] FLOW RATE COMPUTER

[75] Inventors: Raymond W. Honey, La Habra; Louis Katz, Anaheim, both of Calif.

[73] Assignee: Electrac, Inc., Anaheim, Calif.

[22] Filed: Jan. 10, 1975

[21] Appl. No.: 540,160

[52] U.S. Cl. .......................... 235/151.34; 73/194 E
[51] Int. Cl.² ...................... G06F 15/20; G01F 1/00
[58] Field of Search ................... 235/151.34, 92 FL; 73/194 E, 194 R

[56] References Cited
UNITED STATES PATENTS

| | | |
|---|---|---|
| 3,739,636 | 6/1973 | Versaci et al. ............. 235/151.34 X |
| 3,779,457 | 12/1973 | Cornyn, Jr. et al. ........ 235/151.34 X |
| 3,854,038 | 12/1974 | McKinley ...................... 235/151.34 |
| 3,866,028 | 2/1975 | Schontzler et al. ............ 235/151.34 |

*Primary Examiner*—Edward J. Wise
*Attorney, Agent, or Firm*—Harold C. Horwitz

[57] ABSTRACT

A method of correcting the non-linearity of flow meters to extend their usable range, including alternate means to manually enter fluid viscosity by front panel switches or by an analog to digital converter from a temperature probe. The flow rate computer computes frR, divides it by fr/Mfi to yield an output signal fo = MRfi which is a more accurate and linear signal versus flow representation. The flow rate computer extends flowmeter linear range by as much as 100 to 1.

1 Claim, 3 Drawing Figures

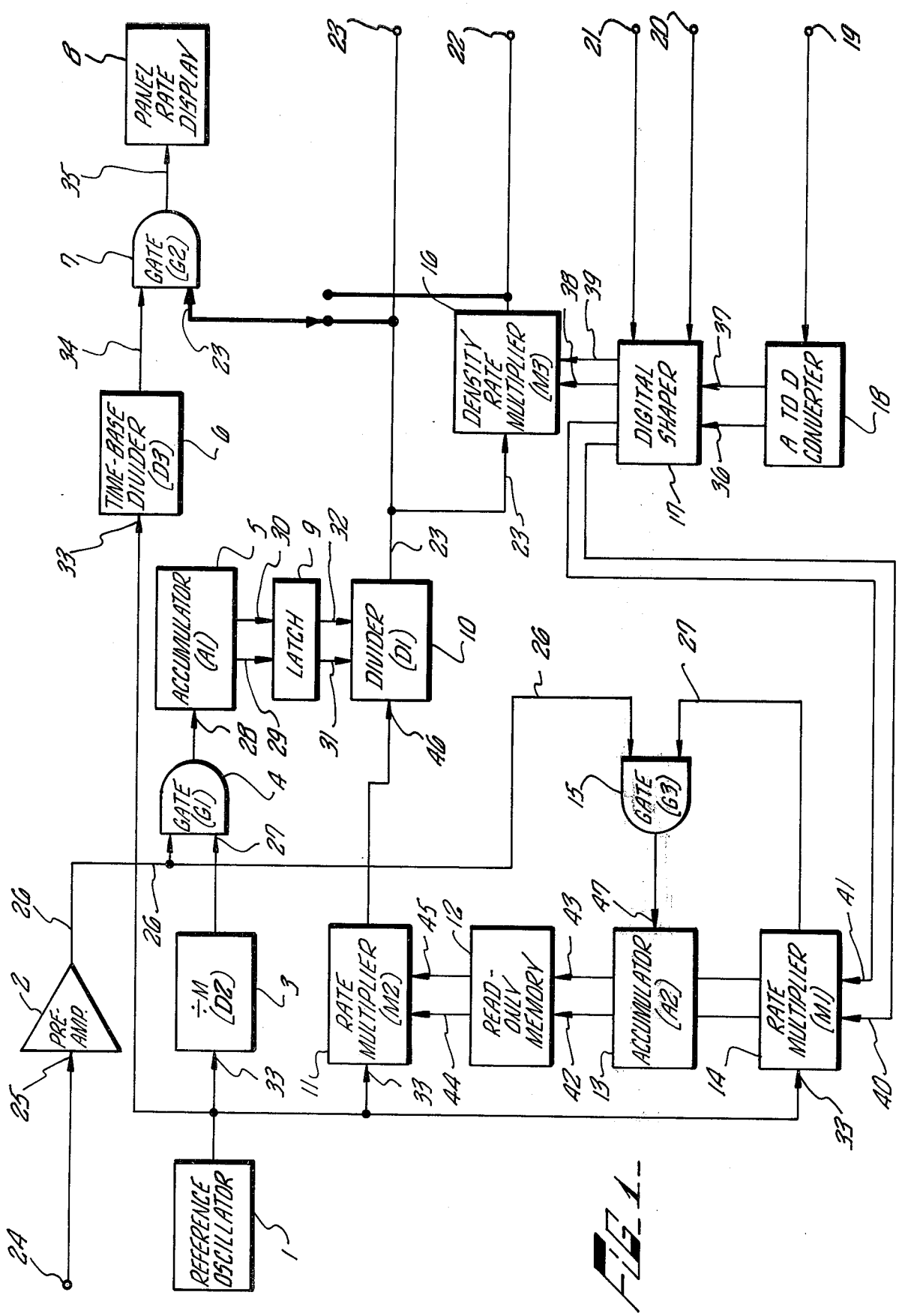

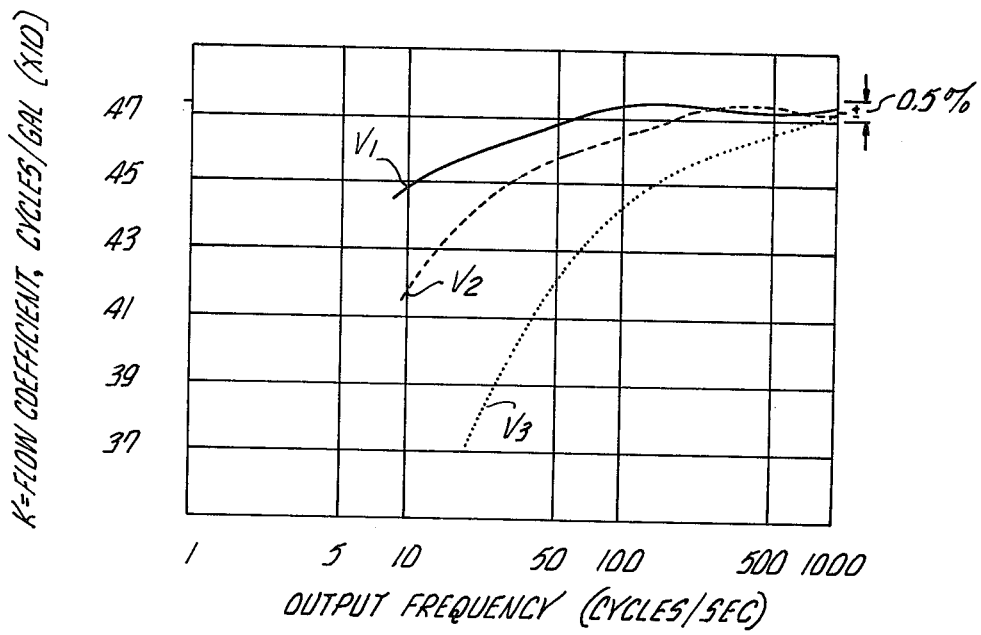
FIG_2
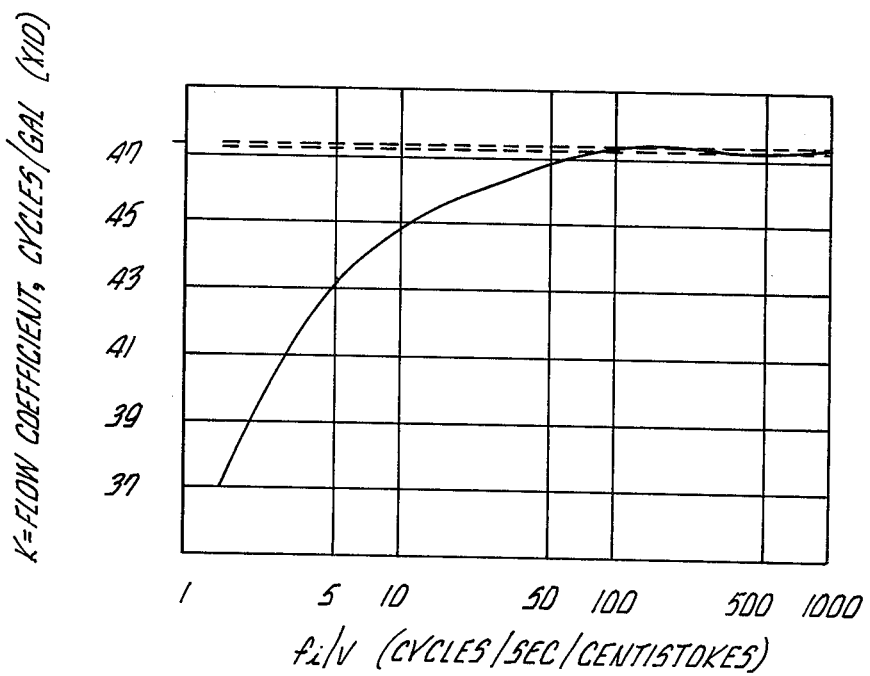
FIG_3

FLOW RATE COMPUTER

BACKGROUND OF THE INVENTION

The linear range of modern turbine flowmeters, usually considered to ± 0.5%, is often quite limited and is seldom better than 10 to 1 in dynamic range for a wide range of viscosities. If the turbine meter is calibrated to several viscosities, a family of curves can be plotted, essentially as shown in FIG. 2. The responses indicated are repeatable and the flowmeter range can be extended as much as 100 to 1. However, this does require reference to correction tables or graphs to accurately determine flow.

The family of curves can be reduced to a plot of K, or cycles per gallon, versus frequency, divided by the viscosity as in FIG. 3. The obvious disadvantage, the need to refer to graphs, remains in the present techology if flowmeters are used, over wide ranges of viscosities.

Applicant has devised a method of correcting the non-linearity of flow meters and has extended their usable range by as much as 100 to 1.

SUMMARY OF THE INVENTION

In accordance with the invention, there is provided a novel method of correcting the non-linearity of flow meters. The Flow Rate Computer is typically used with a turbine flowmeter which has a so-called universal curve, see FIG. 3. This curve is a plot of K factor (cycles per gallon) versus fi/V which is the ratio of input frequency divided by viscosity in centistokes. The Flow Rate Computer effectively corrects for the varying K and scales in engineering units resulting in an effective, constant K. To accomplish this, it is necessary to compute fi/V, "look up" a pre-set correction factor stored in a read-only memory and select a suitable R to maintain the output frequency, fo, proportional to gallons per minute. The output rate is: fo = MRdfi; where M is a fixed integer which depends on the flowmeter calibration constant, K, engineering units, etc.; R is a set of typically 128 integers which are preprogrammed into a read-only memory from data on the flowmeter's non-linearity; $d$ is a number proportional to density which allows volumetric units to be converted to mass; and, fi is the input pulse rate to the Flow Rate Computer.

Accordingly, one primary feature of the present invention is to provide compensaton for non-linearity of fi versus flow to yield a more accurate scaled and linear fo versus flow.

Another feature of the present invention is to provide means for digital multiplication of the output frequency fo = MRfi by d to result in an additional output scaled by density or specific gravity. This output is fo = MRfid.

BRIEF DESCRIPTIONS OF THE DRAWINGS

FIG. 1 is a block diagram illustrating the preferred embodiment of the Flow Rate Computer.

FIG. 2 is a plot of flow coefficient K, in cycles per gallon, versus output frequency, shown for three viscosities.

FIG. 3 is a composite calibration curve (universal curve) of K factor in cycles per gallon versus fi/V which is the ratio of input frequency divided by viscosity in centistokes.

DETAILED DESCRIPTION OF THE PREFERRED EMBODIMENTS

Referring now to FIG. 1, a block diagram is shown illustrating the Flow Rate Computer according to the present invention. The input signal fi is applied to the system input 24 and to the preamplifier 2 input 25 for signal amplification and limiting. Preamplifier 2 converts the input signal fi to a logic level square wave and preamplifier output 26 is applied to gate G1, 4 at first gate input 26 and opens the gate G1, 4 for one period of the input signal fi.

A signal, fr, from the reference oscillator 1, typically 4 MHZ, is applied to divider D2, 3 at input 33 for division by a pre-set integer M. Integer M is typically factory set at a level determined by the characteristics of the particular flow meter being used in conjunction with the Flow Rate Computer. Reference oscillator signal fr, after division by divider D2, 3 results in a signal, fr/M, applied to the second input 27 of gate G1, 4. Output of gate G1, 4 results in signal fr/Mfi and is applied to accumulator A1, 5 input 28 which is typically a 16 bit accumulator. The number stored in accumulator A1, 5 is applied to latch 9 at inputs 29, 30 where it is updated every other period of input signal fi. Second period of input signal fi is used to reset the accumulator A1, 5 and a third period is used for new number accumulation. Hence, every other period is used for counting and alternate periods for updating latch 9 and resetting accumulator Al, 5. The number fr/Mfi held in latch 9 is applied to divider D1, 10 input lines 31 and 32.

The viscosity of the material whose flow is being measured is entered either digitally from Flow Rate Computer front panel switches 20, 21 or from an analogue to digital converter 18 whose output results in a digital number proportional to viscosity. The input 19 of the analogue to digital converter is controlled by a remote temperature sensor which may be used in lieu of manually entering viscosity at front panel switches 20, 21. A digital shaper 17 is inputted by analogue to digital converter 18 output lines 36 and 37 or by digital switch lines 20 and 21. The number from the digital shaper 17 controls rate multiplier M1, 14 with input levels at inputs 40, 41 and the rate multiplier M1, 14 outputs a frequency frV which is proportional to viscosity. Digital shaper 17 also inputs density rate multiplier M3, 16 on lines 38, 39. A reference frequency fr to rate multiplier M1, 14 is provided by reference oscillator 1 at input line 33.

Rate multiplier M1, 14 output frequency frV is applied to gate G3, 15 at input line 27. Line 26 provides input gate frequency fi. Output 47 from gate G3, 15, yields frV/fi, and is accumulated in accumulator A2, 13. Lines 42, 43 from accumulator A2, 13 yields an output address to the read-only memory 12. The read-only memory is factory pre-programmed with a set of typically 128 integers R whose values are determined from data on the non-linearity of the particular flowmeter being used. FIG. 3 is a typical representation of the "universal flowmeter curve", showing a plot of cycles per gallon versus frequency per centistoke. The output of the read-only memory, related to one of the 128 points on the fi/V axis of the universal curve, is inputted on lines 44, 45 to the rate multiplier M2, 11. The output frR of the rate multiplier M2, 11 is applied to divider D1, 10 on line 46 and frR is divided by the number held in latch 9, fr/Mfi, resulting in an output frequency fo = MRfi on line 23.

The output signal, fo = MRfi is applied to gate G2, 7 which is controlled by time base divider D3, 6, applied on line 34. Gate G2, 7 output line 35 inputs the panel rate display 8.

The output signal MRfi can also be applied to a density rate multiplier M3, 16 to yield an alternate output MRdfi on line 22. As an option, output of density rate multiplier M3 may be connected to panel rate display 8 through switch connected to gate G2.

Various configurations can be provided for accumulation of outputs for fixed periods, yielding flow rate, or output can be continually accumulated, yielding total flow.

What is claimed is:

1. A Flow Rate Computer for correcting the non-linearity of flow meters comprising:
   converter means for converting an analog representation of viscosity to a digital representation;
   digital shaper means for digitizing the manual assignment of viscosity and analog representation thereof;
   a reference oscillator;
   a first rate multiplier having an input and an output, the input being connected to the digital shaper and reference oscillator whereby the first rate multiplier provides a signal proportional to the reference oscillator frequency and the viscosity;
   first accumulator means for receiving the output of the first rate multiplier;
   a second rate multiplier;
   a read-only memory programmed according to flow meter data to provide a signal R to second rate multiplier having an input and an output, the input being connected to the read-only memory and the reference oscillator whereby the second rate multiplier provides a signal proportional to the reference oscillator frequency and R;
   a first divider with an input connected to the reference oscillator whereby the first divider provides for division of the reference oscillator frequency by a pre-set integer determined by the flow meter characteristics;
   a second accumulator means for receiving the output of the first divider;
   a latch means for updating the number stored in the second accumulator;
   second divider means for dividing output of first rate multiplier by the number held in the latch;
   a third rate multiplier having an input and an output, the input being connected to the digital shaper and second divider means; and
   a panel rate display actuated by output of second divider or density rate multiplier.

* * * * *